US005721003A

United States Patent [19]
Zeller

[11] Patent Number: 5,721,003
[45] Date of Patent: Feb. 24, 1998

[54] FOAMING COFFEE CREAMER AND INSTANT HOT CAPPUCCINO

[75] Inventor: Bary L. Zeller, Brookfield, Conn.

[73] Assignee: Kraft Foods, Inc., Northfield, Ill.

[21] Appl. No.: 617,340

[22] Filed: Mar. 18, 1996

[51] Int. Cl.$^6$ ........................................... A23F 5/40
[52] U.S. Cl. .................. 426/570; 426/561; 426/569; 426/591; 426/594; 426/595
[58] Field of Search .................... 426/477, 561, 426/569, 570, 586, 591, 594, 595

[56] References Cited

U.S. PATENT DOCUMENTS

| | | | |
|---|---|---|---|
| 3,241,977 | 3/1966 | Mitchell et al. | 426/591 |
| 3,888,998 | 6/1975 | Sampson et al. | 426/67 |
| 4,046,926 | 9/1977 | Gardiner | 426/613 |
| 4,092,438 | 5/1978 | Tonner | 426/601 |
| 4,316,916 | 2/1982 | Adamer | 426/329 |
| 4,374,155 | 2/1983 | Igoe et al. | 426/569 |
| 4,414,198 | 11/1983 | Michaelson | 424/44 |
| 4,438,147 | 3/1984 | Hedrick, Jr. | 426/570 |
| 4,450,182 | 5/1984 | Stahl et al. | 426/565 |
| 4,746,527 | 5/1988 | Kuypers | 426/569 |
| 4,748,040 | 5/1988 | Kuypers | 426/569 |
| 4,752,465 | 6/1988 | Mackles | 424/45 |
| 4,760,138 | 7/1988 | So et al. | 536/102 |
| 4,943,443 | 7/1990 | Evers | 426/569 |
| 5,013,576 | 5/1991 | Nakazawa et al. | 426/640 |
| 5,350,591 | 9/1994 | Canton | 426/564 |
| 5,521,293 | 5/1996 | Vermeer et al. | 536/53 |

FOREIGN PATENT DOCUMENTS 44-07361A1 7/1995 Germany.
57-039742 3/1982 Japan.

OTHER PUBLICATIONS

"Acidulants: Ingredients That do More Than Meet The Acid Test", Food Technology, vol. 76, Jan. 1990, pp. 76–83.
Deane et al., "Coagulation of Milk for Cheese Making by Ester Hydrolysis", Journal of Dairy Science 43 (1960), pp. 1421–1429.
Brochure: "GDL (Glucono Delta Lactone) Acidulant for Food Products", PMP Fermentation Products, Inc., Rosemont, Illinois 60018.

Primary Examiner—Thomas R. Weber
Attorney, Agent, or Firm—Thomas A. Marcoux; Thomas R. Savoie

[57] ABSTRACT

A particulate dry mix foaming creamer comprises a conventional particulate creamer for coffee beverages and the like together with a foam generating component comprising gluconolactone and an alkali metal carbonate or bicarbonate. A dry mix instant hot cappuccino product in accordance with the invention comprises a water soluble coffee component, the foam generating component, an optional creamer component, and an optional sweetener component. Cappuccino beverages are prepared by mixing a liquid component and the dry mix composition and heating. A good quality cappuccino is produced with either dairy or non-dairy creamer. With dairy creamers, the formation of floating white aggregates on the surface of the beverage is avoided.

19 Claims, No Drawings

FOAMING COFFEE CREAMER AND INSTANT HOT CAPPUCCINO

BACKGROUND OF THE INVENTION

The invention relates to dry mix instant hot cappuccino products, to foaming coffee creamers, and to methods of preparing hot cappuccino beverages.

Conventional dry mix instant hot cappuccino compositions include a coffee component, a foaming creamer component, an optional sweetener component, together with other optional components such as flavor, color, and foam stabilizer components. The compositions are normally provided as a particulate powder or granular composition. A hot cappuccino beverage is prepared by dissolving the instant cappuccino composition in a hot liquid such as hot water or hot milk. Sweetener, if not present in the composition, is normally added when the beverage is prepared. Hot cappuccino beverages have a substantial and characteristic foam on the top surface of the beverage. In the case of a brewed cappuccino, the foam is usually provided by steamed milk. In an instant cappuccino product, the foam is provided by a particulate, dry mix foaming creamer which may be of the dairy or non-dairy type. Conventional foaming creamers are disclosed in U.S. Pat. No. 4,438,147, U.S. Pat. No. 4,746,527 and U.S. Pat. No. 4,748,040. The foaming creamers have a gas incorporated in the matrix which is incorporated into the creamer during its preparation. As a result, the density of the creamer is reduced, typically to provide a bulk density of about 0.10–0.4 g/cc. The amount of foam produced by the creamer depends on the amount of gas that is incorporated into the creamer. There is a finite limit to the amount of gas that can be incorporated into a gasified creamer. Moreover, as the amount of incorporated gas is increased, the creamer particles become more fragile and will lose some foaming ability if the fragile particles are broken. In addition, there is a limit on the amount of creamer that can be used to make an acceptable hot cappuccino beverage. Thus, there are definite limits on the amount of foam that can be provided by incorporating a foaming creamer in a hot cappuccino beverage.

It has been proposed in German Offenlegungschrift No. 4,407,361 A1 published Sep. 7, 1995, to utilize a carbonate foaming agent such as sodium hydrogen carbonate in a dry mix instant cappuccino product. An acid may be employed to intensify the decomposition of the bicarbonate and the generation of foam. In order to prevent curdling of milk protein, it is proposed to employ vegetable protein such as soy protein or animal protein such as hydrolyzed gelatin. The acid component is preferably encapsulated with fat.

It is an object of the invention to provide a particulate dry mix foaming creamer which does not require incorporation of a gas for creating a characteristic cappuccino foam.

It is a further object of the invention to provide a particulate dry mix foaming dairy creamer which does not require incorporation of a gas for creating a characteristic cappuccino foam and which does not cause the formation of floating white aggregates on the surface of a beverage prepared with the creamer.

It is a further object of the invention to provide a dry mix instant hot cappuccino composition which does not require a gasified foaming creamer for creating a characteristic cappuccino foam.

BRIEF SUMMARY OF THE INVENTION

A particulate dry mix foaming creamer in accordance with the invention comprises a creamer component, preferably a dairy creamer component, and a foam generating component comprising gluconolactone and an alkali metal carbonate or bicarbonate. Gluconolactone is also known as glucono delta lactone ("GDL") and delta gluconolcatone. See The Merck Index, Ninth Edition, No. 4288.

An instant, particulate dry mix instant hot cappuccino composition in accordance with the invention comprises a water soluble coffee component, a foam generating component comprising gluconolactone and an alkali metal carbonate or bicarbonate, an optional creamer component, preferably an optional dairy creamer component, an optional sweetener component, and, optionally, other minor ingredients such as foam stabilizers, color, flavor, and the like.

A preferred method of preparing a hot cappuccino beverage in accordance with the invention comprises admixing a dry mix component comprising a water soluble coffee component and a foam generating component which comprises gluconolactone and a carbonate or bicarbonate, with a liquid component which is suitably milk or water, the dry mix component further comprising a dairy creamer when the liquid component is water, and heating the admixture to cause the foam generating component to generate foam. Heating is preferably effected by heating the admixture in a microwave oven, but may be effected by pre-heating the liquid component.

DESCRIPTION OF PREFERRED EMBODIMENTS

All amounts given in percent herein are in percent by weight, unless otherwise stated.

The coffee component in the instant dry mix cappuccino composition comprises soluble coffee solids. Conventional spray dried instant coffee is preferred, but any type of powdered or granular dry soluble coffee solids may be employed. The composition may also include chocolate or other flavor ingredients which are intended to modify the coffee flavor of the cappuccino beverage. The amount of the coffee component in the composition will vary considerably depending on the desired flavor. For an individual serving, the amount of the coffee component will generally from 0.75 to 5 grams, preferably 1–4 grams.

The carbonate or bicarbonate of the foam-generating component is soluble in hot water, solid at temperatures of up to at least about 150° F., preferably provided in particulate form, is preferably a bicarbonate and is more preferably potassium bicarbonate. A sodium salt may also be used but the potassium salt can be used in a greater amount without an adverse effect on beverage flavor.

The carbonate or bicarbonate component is suitably present in an amount of 0.01 to 1.0 parts by weight, preferably 0.025 to 0.33 parts by weight, per part by weight of the soluble coffee component. For an individual serving containing from 0.75 to 5 grams of soluble coffee, 0.05 to 0.7 grams of the carbonate or bicarbonate is suitable.

The amount of gluconolactone in the foaming creamer or in the instant cappuccino is generally an amount sufficient to neutralize the carbonate or bicarbonate and which will result in a pH of from 5.5 to 7 in a cappuccino beverage prepared from the composition. The required amount of gluconolactone depends, of course, on the amount of bicarbonate, the pH of the system in the absence of the acidulant, the strength of the gluconolactone, etc. An amount of from about 0.035 to 3.5 parts, preferably 0.075 to 1 part, by weight of gluconolactone per part by weight of soluble coffee is suitable. For an individual serving containing 0.75–5 grams of soluble coffee, a suitable amount of gluconolactone is from 0.15 to 2.5 grams. It is an advantage of the invention that the gluconolactone is not required to be encapsulated.

The creamer component of the foaming creamer of the invention may be any conventional particulate creamer suitable for coffee beverages and the like. The creamer component may be of the foaming or non-foaming type, and may be any combination of these types. The creamer component may also include a non-dairy creamer. However, the invention has particular utility in minimizing the formation of white aggregates which form on the surface of a cappuccino beverage when it is attempted to utilize an acid and a carbonate or bicarbonate to produce cappuccino-type foam from a dairy creamer. Accordingly, the invention has particular utility where the creamer component contains little or no non-dairy creamer. Accordingly, if non-dairy creamer is employed, it is preferably employed in an amount of less than 50%, preferably less than 25%, and more preferably less than 10% by weight, based on the weight of the creamer component. For example, the creamer component may be made up of a non-foaming dairy creamer together with a foaming dairy creamer, a foaming or a non-foaming dairy creamer together with not more than 50% by weight of foaming or non-foaming non-dairy creamer, etc. The expression "dairy creamer" as used herein means a creamer which contains whole milk solids or whole milk solids having a reduced content of milk fat. The expression "non-dairy creamer" as used herein means a creamer which contains no appreciable quantity of milk-derived ingredients.

The optional creamer component of the dry mix instant cappuccino composition of the invention, if present, is preferably a dairy creamer and is preferably present in an amount of from 1 to 20 parts by weight, more preferably from 1–10 parts by weight, per part by weight of the coffee component of the composition.

A foaming creamer in accordance with the invention comprises a creamer component, preferably a dairy creamer, as described above together with a foam generating component as described above comprising gluconolactone and carbonate or bicarbonate. These foaming creamers can be used with dry mix soluble coffee products or with liquid beverages such as brewed coffee.

The amount of the gluconolactone in a foaming creamer in accordance with the invention is generally 3.5–35% based on the creamer weight.

The amount of the bicarbonate or carbonate in a foaming creamer in accordance with the invention is generally 1–10% based on the creamer weight. Where the creamer component is of the non-foaming type, the amount of the bicarbonate or carbonate is preferably from 4–10%, based on the creamer weight. Where the creamer component is of the foaming type, the amount of bicarbonate or carbonate is preferably 1–6%, based on the creamer weight.

A foaming creamer product in accordance with the invention may be packaged for an individual beverage serving or for multiple beverage servings. For an individual serving, the amount of the creamer is preferably about 3–20 grams and more preferably about 5–15 grams.

A sweetener component is optional in the present instant hot cappuccino formulation. If present, it is present in an amount sufficient to provide sweetness appropriate for a hot cappuccino beverage. Natural sugar sweeteners such as granulated sucrose are preferred. Other sugars may, however, be employed, either alone or in combination with sucrose. An artificial sweetener may also be employed in an amount which depends on the sucrose equivalence, provided that it will be effective in a hot cappuccino beverage. Where sucrose is employed as the sole sweetener in the hot cappuccino composition, an amount of from 1 to 20 parts by weight, per part by weight of the coffee component, is suitable and an amount of 1 to 8 parts per weight per part by weight of the coffee component is preferred. Where a different sweetener is utilized either alone or in combination with sucrose, it is preferably employed in an amount such that the sweetness of the sweetener component is equivalent to the amount of sucrose mentioned above. Thus, it is preferred that a beverage prepared from a sweetened hot cappuccino composition in accordance with the invention has a sweetness within the range of sweetness that would result from the use in the composition of sucrose alone in the amount mentioned above.

A foam stabilizer can also be incorporated in an amount sufficient to reduce foam loss as a function of time. In general, an amount of stabilizer of 0.1 to 5% based on the weight of the coffee component is suitable. Several foam stabilizers suitable for use in the present invention are known for use in connection with conventional gasified foaming creamers such as those described in the U.S. patents mentioned above. These stabilizers include sodium caseinate, emulsifiers, and hydrocolloids, either alone or in combination.

The composition may also include other components normally employed in instant hot cappuccino compositions such as flavoring, coloring, silicon dioxide, buffers such as trisodium citrate, and the like. It is preferred to keep the composition free of added fiber or other ingredients not normally utilized in instant hot cappuccino compositions.

Cappuccino beverages are prepared from the dry mix composition in several ways. Where the cappuccino composition does not include a creamer component, a separate creamer component, preferably a dairy creamer, may be employed and the beverage prepared by adding the creamer component and hot water or by adding the creamer component and water and then heating, preferably in a microwave oven, or by a combination of these methods. Alternatively, the cappuccino beverage may be prepared without a creamer component by adding hot milk or by adding milk and heating, preferably in a microwave oven. Combinations of these techniques can also be employed such as by employing a reduced amount of creamer component and adding water and milk. The milk can be whole milk or milk which is reduced in milk fat content such as skim milk or milk containing 1% or 2% milk fat. A preferred technique for preparing the beverage is to add milk, preferably at a refrigeration temperature, typically in the range of 35°–50° F., to the dry mix cappuccino composition with stirring and without the use of a creamer component and to heat the beverage to a temperature of about 140°–190° F., preferably by heating in a microwave oven under conditions such that the target temperature is reached within three minutes, preferably with two minutes, in order to generate a good cappuccino beverage foam. Conventional home microwave ovens operating at 400 to 800 watts and a wavelength of 2450 Mhz are suitable. The milk preferably has a milk fat content which is not in excess of 2%. The serving size of the coffee component in this preferred embodiment is from 0.75 to 5 grams of soluble coffee per serving of beverage (4 to 8 fluid ounces of beverage). When the dry mix composition includes sufficient creamer, a hot cappuccino beverage can be prepared by adding water and heating. Heating can be effected either before or after adding the water and such heating is preferably effected in a microwave oven.

Preferred cappuccino compositions are of single serving size, containing from 0.75 to 5 grams of soluble coffee, and are preferably of three types: compositions containing neither creamer or sweetener; compositions containing a sweetener but no creamer; and compositions containing both a creamer and a sweetener. Each of these preferred individual serving compositions contains an amount of gluconolactone sufficient to neutralize the carbonate or bicarbonate and to obtain a beverage pH of 5.5 to 7. Where a sucrose sweetener is employed, it is preferably employed in an amount of from 1–20 parts by weight, preferably from 1–10 parts by weight, per part by weight of soluble coffee. Where other sweeteners are employed, the amount of sweetener is preferably equivalent to the sweetness that would be achieved by employing sucrose as the sole sweetener in the weight range mentioned above. Where a creamer is employed, it is preferably employed in an amount of from 1–20 parts by weight, preferably from 1–8 parts by weight, per part by weight of soluble coffee.

EXAMPLES

Hot cappuccino beverages are prepared from packets of a commercial instant cappuccino product containing a low density dairy-type type foaming creamer. The contents of a packet (12 grams) are dry mixed with 0.21 grams of potassium bicarbonate and several different acidulant additives in amounts reported in Table I. The mixture is placed in a low profile cappuccino cup and water at 190° F. is added with stirring. In a first control, no additives are mixed with the commercial product and in a second control only the bicarbonate is added. In other runs, several different acidulant additives, including gluconolactone, are added, in various amounts, as reported in Table I. Foam volume, beverage pH, change in flavor relative to the first control, and the presence or absence of white floating aggregate on the surface of the beverage are reported in Table I, and results are summarized in Table II.

It will be seen that all additives other than gluconolactone either cause formation of floating aggregates or suffer from one or more of the following deficiencies: incomplete solubility with resultant precipitation; saltiness or other apparent flavor or texture change; insufficient acidity to drive reaction with bicarbonate to generate adequate foam; or insufficient acidity to maintain original beverage pH.

TABLE I

| Run No. | Additive Type | Weight (g) | Amount of Floating Aggregates | Foam Volume | Beverage pH | Flavor/ Change |
|---|---|---|---|---|---|---|
| 1 | none (control) | — | none | low | 5.8 | — |
| 2 | none + bicarbonate | — | none | moderate | 8.0 | off/alkaline |
| 3 | citric acid | 0.12 | high | very high | 6.1 | low |
| 4 | ascorbic acid | 0.34 | high | very high | 5.9 | — |
| 5 | ascorbic acid + citric acid | 0.34 + 0.10 | high | very high | 5.9 | low |
| 6 | GDL | 0.27 | none | moderate | 6.3 | low |
| 7 | GDL | 0.34 | none | high | 6.0 | low |
| 8 | GDL | 0.42 | none | high | 5.8 | low |
| 9 | potassium bitartrate | 0.20 | moderate | moderate | 6.2 | low |
| 10 | calcium acid phosphate | 0.22 | low(1) | high | 6.4 | low |
| 11 | calcium acid phosphate | 0.30 | low(2) | high | 6.2 | low |
| 12 | calcium acid phosphate | 0.50 | high(3) | very high | 5.6 | low |
| 13 | potassium metaphosphate | 0.50 | low | low | 7.0 | — |
| 14 | sodium acid pyrophosphate | 0.31 | none | moderate | 6.1 | very salty |
| 15 | sodium acid pyrophosphate | 0.16 | none | moderate | 6.8 | salty |
| 16 | monocalcium fumarate | 0.42 | high(4) | high | 5.3 | sour/chalky |
| 17 | monocalcium fumarate | 0.20 | moderate(5) | high | 5.8 | sour/chalky |
| 18 | monosodium citrate | 0.28 | moderate | moderate | 5.9 | salty |
| 19 | disodium citrate | 0.70 | low | moderate | 6.1 | very salty |
| 20 | monosodium phosphate | 0.18 | none | moderate | 6.6 | salty |
| 21 | monosodium phosphate | 0.65 | none | high | 6.3 | very salty |
| 22 | fumaric | 0.09 | high | very high | 6.1 | sour |
| 23 | fumaric acid (cold-soluble) | 0.09 | moderate | very high | 6.1 | very sour |
| 24 | alginic acid | 0.44 | high | very high | 5.9 | low |
| 25 | alginic acid | 0.22 | low | high | 6.4 | low |
| 26 | alginic acid + GDL | 0.22 + 0.22 | low | very high | 5.9 | low |
| 27 | alginic acid + GDL | 0.20 + 0.25 | low | very high | 5.9 | low |
| 28 | alginic acid + GDL | 0.10 + 0.35 | none | very high | 5.8 | low |
| 29 | alginic acid + monocalcium fumarate | 0.25 + 0.15 | high | very high | 5.8 | salty |
| 30 | cinnamic acid | 0.30 | moderate | very high | 5.8 | bitter/musty |
| 31 | adipic acid | 0.15 | high | very high | 5.8 | — |
| 32 | high-methoxy pectin | 0.50 | none | high | 6.4 | organic |
| 33 | carrageenan + citric acid | 0.20 + 0.15 | very high | high | 5.9 | — |
| 34 | Kelcoloid-S alginate ester(4) | 0.50 | none | high | 6.7 | slightly off |
| 35 | Kelcoloid-S + GDL | 0.50 + 0.42 | none | high | 5.7 | slightly off |
| 36 | Kelcoloid-S + GDL | 0.50 + 0.20 | none | moderate | 6.2 | slightly off |
| 37 | Kelcoloid-S + GDL | 0.10 + 0.42 | none | high | 5.8 | low |
| 38 | monopotassium fumarate | 0.13 | high | high | 6.0 | low |
| 39 | polygalacturonic acid | 0.50 | high | very high | 5.9 | low |
| 40 | succinic acid | 0.10 | low | very high | 5.9 | very sour |
| 41 | succinic anhydride | 0.12 | low | high | 5.7 | very sour |
| 42 | malic acid | 0.12 | moderate | very high | 5.8 | low |
| 43 | malic acid | 0.15 | high | very high | 6.0 | low |
| 44 | palmitic acid | 0.60 | none | none | 6.3 | — |
| 45 | quinic acid | 0.32 | low | very high | 5.8 | bitter |
| 46 | sodium hexametaphosphate | 0.50 | none | moderate | 6.5 | salty |

TABLE I-continued

| Run No. | Additive Type | Weight (g) | Amount of Floating Aggregates | Foam Volume | Beverage pH | Flavor/ Change |
|---|---|---|---|---|---|---|
| 47 | potassium alum | 0.20 | moderate | very high | 6.2 | low |
| 48 | gum arabic | 0.50 | none | moderate | 6.6 | low |
| 49 | gum arabic | 1.00 | none | high | 6.6 | low |
| 50 | gum arabic + alginic acid | 0.50 + 0.20 | moderate | very high | 6.3 | low |
| 51 | sodium alginate (50% neutralized) | 1.00 | none | very high | 5.9 | slightly salty |
| 52 | potassium alginate (50% neutralized) | 1.00 | none | very high | 6.1 | low |
| 53 | low-methoxy pectin | 0.50 | none | high | 6.3 | low |
| 54 | low-methoxy pectin | 1.00 | none | very high | 5.9 | citrus |
| 55 | monopotassium phosphate | 0.50 | none | high | 6.3 | bitter |
| 56 | sodium aluminum phosphate | 0.20 | none | high | 6.2 | slightly salty |

(1)Insoluble matter
(2)Much insoluble matter
(3)Much insoluble matter
(4)Propylene glycol alginate ester

TABLE II

Additive Performance Summary

| Additive Classification | Foam Height | Effect On Flavor | Solubility | Amount Of Aggregates | Comments |
|---|---|---|---|---|---|
| Traditional Food Acids: | | | | | |
| Citric; Fumaric; Malic, Adipic, Tartaric; Lactic; Ascorbic | Very High | Low | High | High | Widespread floating aggregates. |
| Gluconolactone ("GDL") | High | Low | High | None | No aggregates. |
| Partial Salts of Polyprotic Organics Acids: | | | | | |
| Monosodium Citrate; Potassium Bitartrate; Monopotassium Fumarate | Moderate | Low | High | High | Unacceptable due to aggregates. |
| Disodium Citrate | Low | Salty | High | Low | |
| Partial Salts of Polyprotic Inorganic Acids: | | | | | |
| Sodium Acid Phosphate; Sodium Acid Pyrophosphate | Moderate | Salty | High | None | Cannot maintain original beverage pH without imparting saltiness. |
| Sodium Aluminum Phosphate | Moderate | Salty | Low | None | |
| Partial Calcium Salts of Polyprotic Acids: | | | | | |
| Monocalcium Fumarate | Moderate | Sour | High | None | Stable unsightly foam. |
| Monocalcium Phosphate | Moderate | Low | Low | Low | Partial solubility. |
| Acidic Food Gums: | | | | | |
| Alginic Acid; Polygalacturonic Acid | Very High | Low | High | High | All reduce wetability; raise pH, increase viscosity, and improve foam stability and creaminess. |
| Low-Methoxy Pectin | High | Low | High | None | |
| High-Methoxy Pectin | Moderate | Moderate | High | None | |
| Gum Arabic | Moderate | Low | High | None | |

What is claimed is:

1. A particulate dry mix foaming creamer composition comprising a creamer and a foam generating component comprising gluconolactone and an alkali metal carbonate or bicarbonate.

2. A particulate dry mix creamer composition according to claim 1, wherein said carbonate or bicarbonate is present in an amount of from 1–10% by weight based on the weight of the creamer.

3. A particulate dry mix creamer composition according to claim 1, wherein said gluconolactone is present in an amount of from 1–35% by weight based on the weight of the creamer.

4. A particulate dry mix creamer composition according to claim 1, wherein said creamer comprises a dairy creamer.

5. A particulate dry mix creamer composition according to claim 4, wherein said dairy creamer comprises a foaming creamer.

6. A particulate dry mix creamer composition according to claim 4, wherein said dairy creamer comprises a non-foaming creamer.

7. A particulate dry mix creamer composition according to claim 1, wherein said gluconolactone is not encapsulated.

8. An instant, particulate, dry mix hot cappuccino composition comprising a water soluble coffee component, an optional creamer component, an optional sweetener component, and a foam-generating component, the foam-generating component comprising gluconolactone and an alkali metal carbonate or bicarbonate.

9. An instant hot cappuccino composition according to claim 8 wherein said gluconolactone is present in an amount sufficient to neutralize the carbonate or bicarbonate and to result in a pH of from 5.5 to 7 in a cappuccino beverage prepared from the composition.

10. An instant hot cappuccino composition according to claim 8 wherein said composition includes said creamer component.

11. An instant hot cappuccino composition according to claim 10, wherein said creamer comprises a dairy creamer.

12. An instant hot cappuccino composition according to claim 11 wherein said dairy creamer component comprises a foaming dairy creamer.

13. An instant hot cappuccino composition according to claim 11 wherein said dairy creamer component comprises a non-foaming dairy creamer.

14. An instant hot cappuccino composition according to claim 8 wherein said gluconolactone is present in an amount of from 0.035 to 3.5 parts by weight per part by weight of the coffee component, and wherein said carbonate or bicarbonate is present in an amount of from 0.01 to 1 parts by weight per part by weight of the coffee component.

15. An instant hot cappuccino composition according to claim 11 containing from 0.75 to 5 grams of said coffee component, from 0.15 to 2.5 grams of said food grade acid, and from 0.05 to 0.7 grams of said carbonate or bicarbonate.

16. An instant hot cappuccino composition according to claim 14 further containing a sweetener in an amount equivalent to from 1 to 20 parts by weight of sucrose per part by weight of said coffee component.

17. An instant hot cappuccino composition according to claim 14 further containing a sweetener in an amount equivalent to from 1 to 10 parts by weight of sucrose per part by weight of said coffee component.

18. An instant hot cappuccino composition according to claim 11 wherein said dairy creamer is present in an amount of from 1 to 20 parts by weight per part by weight of said coffee component.

19. An instant hot cappuccino composition according to claim 11 wherein said dairy creamer is present in an amount of from 1 to 8 parts by weight per part by weight of said coffee component.

* * * * *